United States Patent [19]
Nadherny

[11] Patent Number: 5,605,309
[45] Date of Patent: Feb. 25, 1997

[54] PIPE ANCHORING MEANS

[75] Inventor: Rudolph E. Nadherny, Naperville, Ill.

[73] Assignee: Ireco, Inc., Chicago, Ill.

[21] Appl. No.: 418,937

[22] Filed: Apr. 7, 1995

[51] Int. Cl.$^6$ ............................................. F16L 3/08
[52] U.S. Cl. ........................... 248/62; 248/74.4; 403/3; 403/234
[58] Field of Search .................. 248/62, 74.4, 58; 403/234, 235, 3, 4

[56]  References Cited

U.S. PATENT DOCUMENTS

| | | |
|---|---|---|
| 2,546,792 | 3/1951 | Smith et al. . |
| 2,625,354 | 1/1953 | Smith . |
| 4,222,538 | 9/1980 | Jensen et al. . |
| 5,007,604 | 4/1991 | Richards ................................ 248/62 |
| 5,040,751 | 8/1991 | Holub .................................... 248/62 |
| 5,295,647 | 3/1994 | Weidler .................................. 248/62 |
| 5,370,344 | 12/1994 | Nadherny . |
| 5,395,079 | 3/1995 | Jensen et al. . |

*Primary Examiner*—Philip C. Kannan
*Attorney, Agent, or Firm*—Lockwood, Alex, Fitzgibbon & Cummings

[57]  ABSTRACT

In a pipe anchor system for anchoring a relatively long length of pipe or conduit to a structural support with predetermined spacing therefrom. Short pieces of a bar cut to length from a bar of commercial standard shape and size are used to attach the anchor bases of two-part pipe anchors to the structural support. The anchor bases have bar end locating formations including recesses and protuberances to receive in accurate positions thereon one end of each short piece of a commercial bar. The opposite or distal end of each short piece of a bar will be secured to the structural member. The usual clamping wedges are used to clamp the long length of pipe to the anchor bases.

14 Claims, 4 Drawing Sheets

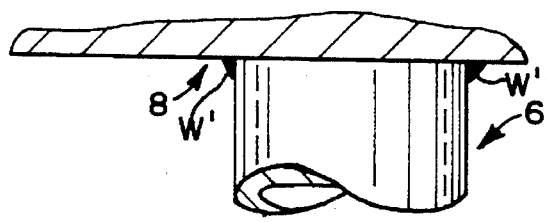
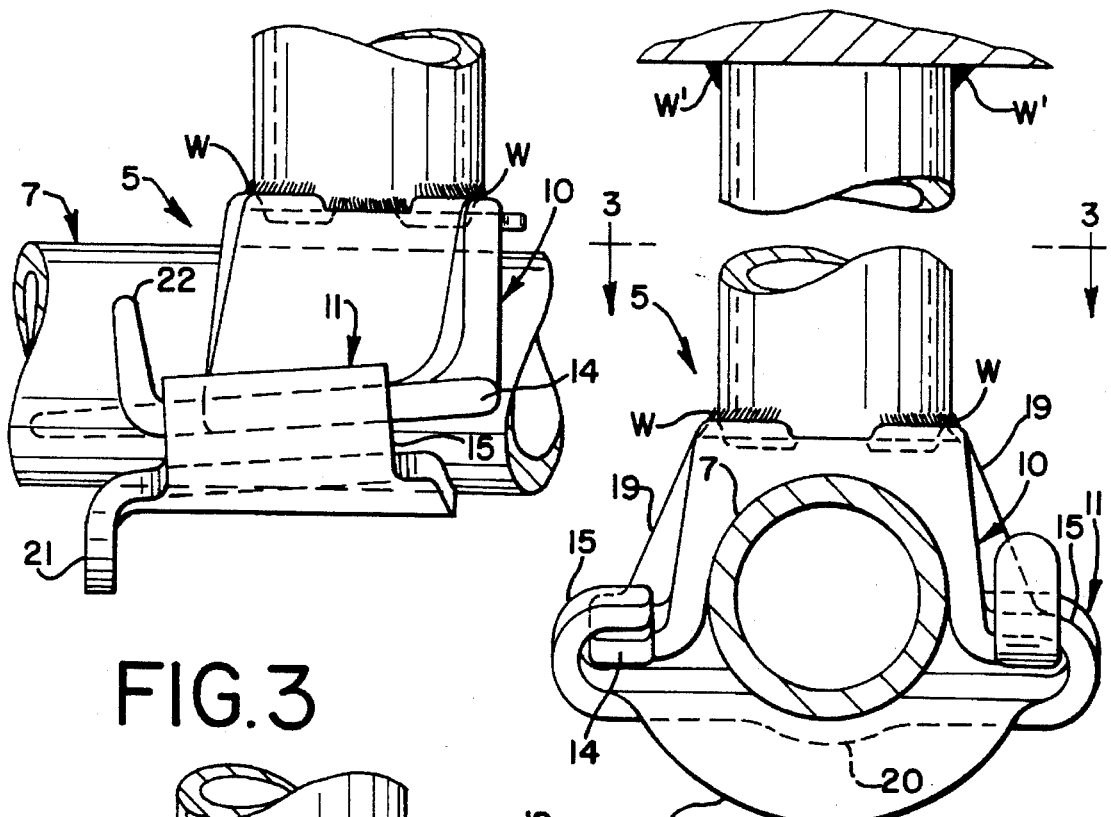
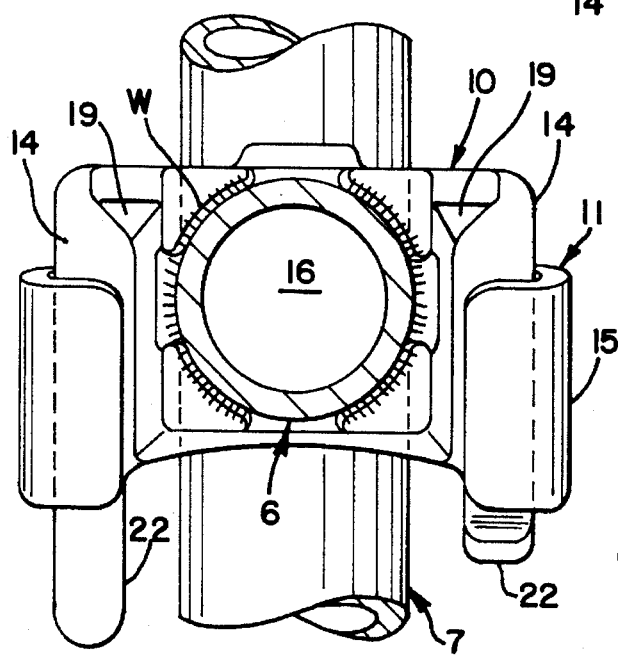
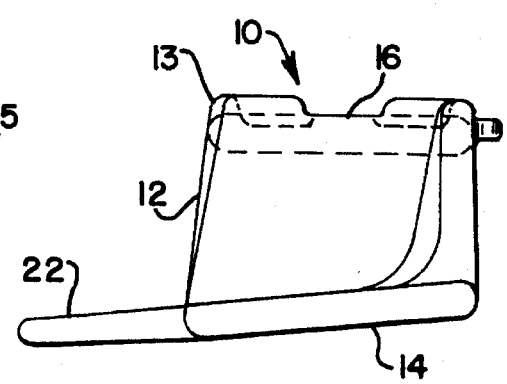

5,605,309

PIPE ANCHORING MEANS

BACKGROUND AND DESCRIPTION OF THE INVENTION

This invention relates, generally, to improvements and innovations in pipe anchors of the type used for anchoring pipes or conduits to structural members, particularly, train pipes to structural members in the underframes of railway cars. Pipe anchors of this general type are known and disclosed, for example, in U.S. Pat. No. 2,546,792 dated Mar. 27, 1951, Pat. No. 2,625,354 dated Jan. 13, 1953, Pat. No. 4,222,538 dated Sep. 16, 1980 and Ser. No. 08/081,790 filed Jun. 23, 1993.

Pipe anchors of this general type comprise an anchor base and a drivable clamping wedge which mates with the anchor base and secures a pipe in the anchor base. Pipe anchors of this general type are in commercial use, particularly in the rail car industry. While there are installations in which anchor bases of the correct dimensions can be directly attached to a structural member as by welding, there are other installations in which the anchor bases either do not have the correct dimensions or cannot be directly secured to the structural member but, instead, have to be spaced a predetermined distance therefrom. In such latter installations, it is customary to utilize specially designed and dimensioned brackets or connectors to interconnect the anchor bases to the structural members. The need to use such special brackets or connectors adds significantly to the costs of the pipe anchor systems, both from the added cost of the special connectors and from the increased cost of the skilled labor involved. The alternative of making anchor bases in several different dimensions or sizes and maintaining inventories thereof is also costly.

According to the present invention, where brackets or other forms of connectors of special design and dimension have heretofore been used in connecting or attaching anchor bases to structural members, now any desired lengths of metal bars of standard and commonly available shapes (e.g. ordinary round pipe, right angle bars, channels and square tubes) are used as the connectors. A bar of standard shape such as round pipe is cut into pieces of any desired length and one end of each piece is readily inserted in a locating recess on an anchor base and secured therein as by welding. The opposite end of the connector piece is then attached, as by welding, to the structural member. When a piece of standard pipe is used as the connector, regardless of the orientation of the anchor base with respect to the structural member, the connector pipe will have the same section modulus.

Since common pipe in standard diameters (e.g. three-quarter inch, one inch and one and a quarter inch) is readily available at low cost, and pipe cutting equipment is likewise readily available, the present invention makes it practical to dispense with either using specially designed and dimensioned brackets and connectors, or using anchor bases that have mounting portions or sections of particular dimensions so as to permit direct attachment to the structural members. Likewise, bars of other standard shapes (e.g. angle iron, channels and square tubes) are commercially available in standard sizes and may be readily cut to length with common tools and may be used in place of pipe. While utilization of anchor bases of predetermined dimensions may avoid the necessity of using attaching brackets or the like, as a practical matter, since the anchor bases are either cast, forged or stamped and require special dies and tooling, the cost thereof adds considerably to the cost of the installations using such special anchor bases in pipe anchor systems. By utilizing inexpensive pieces of standard diameter pipe or of bars of other standard shapes it is possible according to the present invention to provide the appropriate surfaces of standard anchor bases with recesses into which one end of each piece of pipe or other shaped bar connector may be inserted and secured as by welding. Such recesses also serve as locators to enable a manufacturer to readily assemble the pieces of standard pipe or other shaped bars to standard anchor bases in a production plant and also permit workmen in the field to cut off pieces of standard pipe or other shaped bars of desired lengths and readily attach them to the anchor bases.

In light of the foregoing considerations, it will be appreciated by those skilled in the art that an important object of the invention is to materially reduce the cost of pipe anchor installations wherein lengths of pipe or conduit are anchored to structural members such as securing air lines or other train pipes to structural members in the underframes of railway cars.

A specific object of the invention is to make use of short pieces of readily available, inexpensive, standard shapes such as lengths of pipe, right angle bars, channels or rectangular tubes diameter pipe cut to any desired length as connectors in securing standard anchor bases of pipe anchors to structural members, thereby eliminating the need for using either brackets or connectors of special design and dimension, or the need for using pipe anchor bases having particular dimensions whereby they can be directly secured to a structural member. For example, several different sizes of cylindrical standard pipe can be used, e.g. three-quarter inch, one-inch and one and one-quarter inch diameter standard pipe.

A further important object of the invention is to facilitate, and thereby minimize the cost of attaching such short pieces of bars of standard shapes, e.g. standard diameter pipe, to standard anchor bases by providing the anchor bases with special pipe end or other shaped bar end receiving and locating recesses, thereby eliminating the need for special jigs or fixtures and making possible the fast and accurate assembly of the short lengths of standard pipe or of bars of other standard shapes of different standard dimensions to the standard anchor bases, either in a factory setting or in the field.

A further object of the invention is to provide standard anchor bases having special formations or recesses which can receive the ends of several different sizes of standard pipe or bars of other standard shapes.

Certain other important objects of the invention will be apparent to those skilled in the art when the following detailed descriptions of preferred embodiments thereof are considered along with the accompanying drawings, wherein:

BRIEF DESCRIPTION OF THE DRAWINGS

FIG. 1 is a fragmentary side elevational view showing an installation comprising a pipe anchor and a short piece of standard commercial diameter cylindrical pipe securing a train pipe or the like to a rigid support in accordance with the present invention;

FIG. 2 is a left end elevational view of FIG. 1;

FIG. 3 is a top plan view taken on line 3—3 of FIG. 2;

FIG. 4 is a side elevational view of an anchor base forming one component of the pipe anchor shown in FIG. 1;

3

Figure 5:
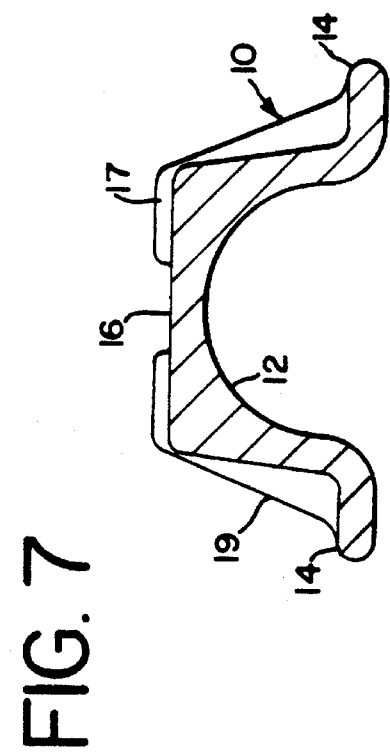
Figure 7:
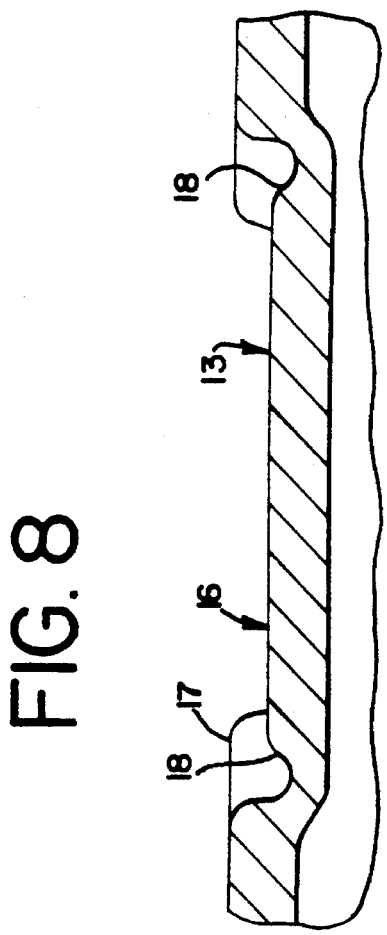
Figure 6:
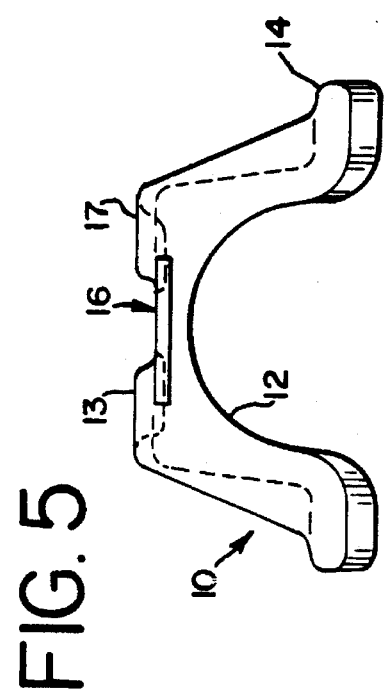
Figure 8:
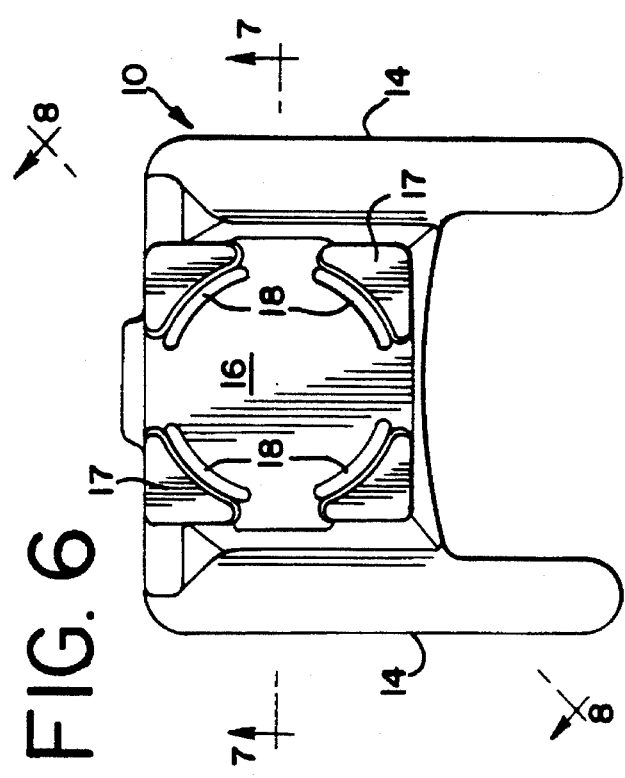
Figure 10:
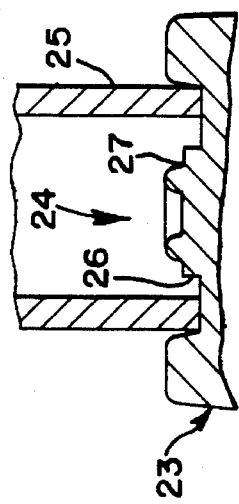
Figure 12:
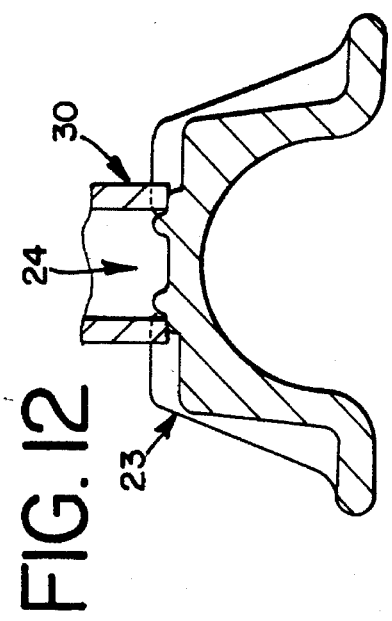
Figure 9:
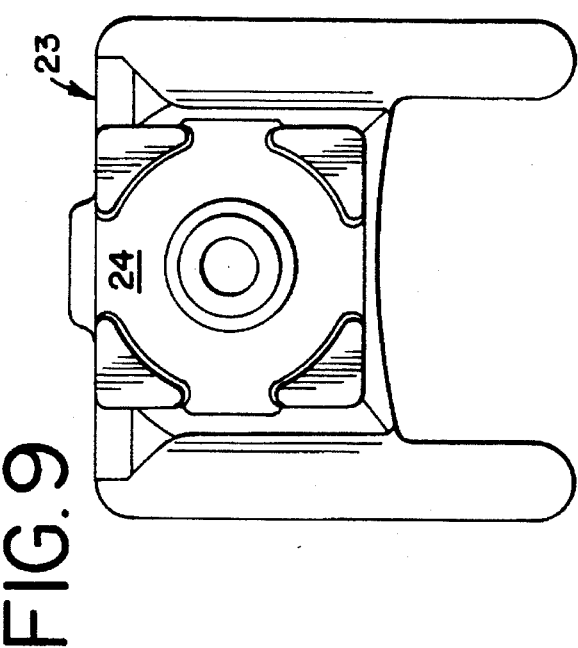
Figure 11:
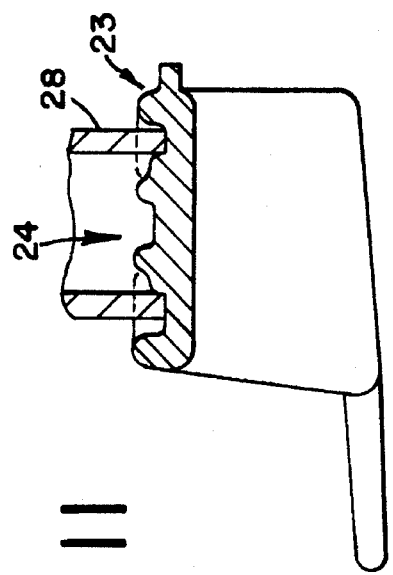

FIG. 5 is a right end elevational view of FIG. 4;

FIG. 6 is a top plan view of the anchor base of FIG. 4;

FIG. 7 is a vertical sectional view taken on line 7—7 of FIG. 6;

FIG. 8 is a fragmentary sectional view on enlarged scale taken on line 8—8 of FIG. 6;

FIG. 9 is a top plan view of an anchor base having a pipe-end receiving and locating recess formation capable of receiving the ends of cylindrical pipe of several different sizes (i.e. diameters);

FIGS. 10–12 are fragmentary vertical sectional views showing pieces of standard commercial sizes secured to the anchor base of FIG. 9.

Figure 13:
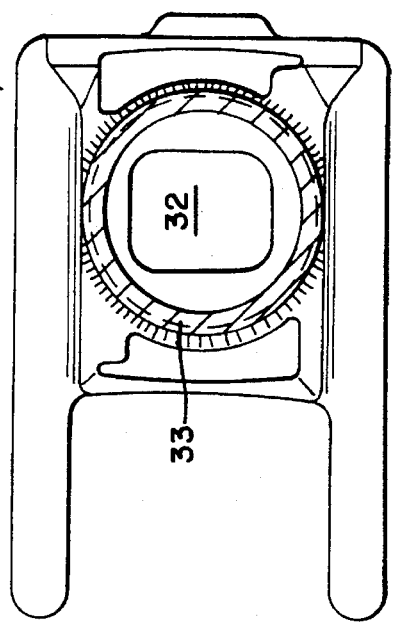
Figure 14:
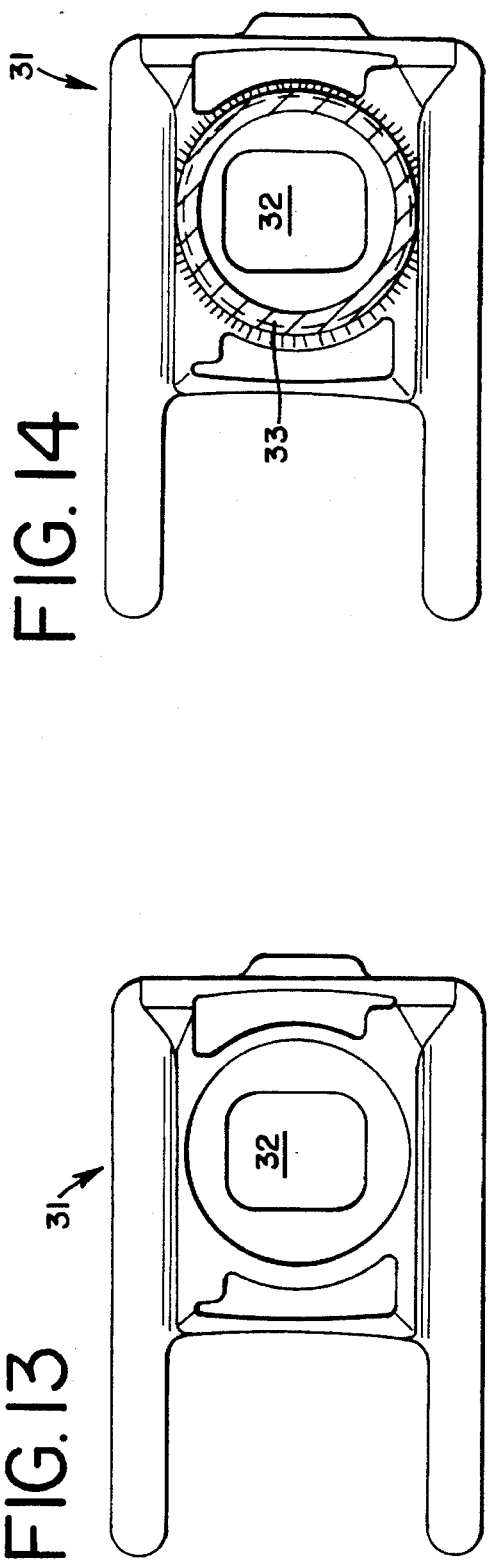
Figure 15:
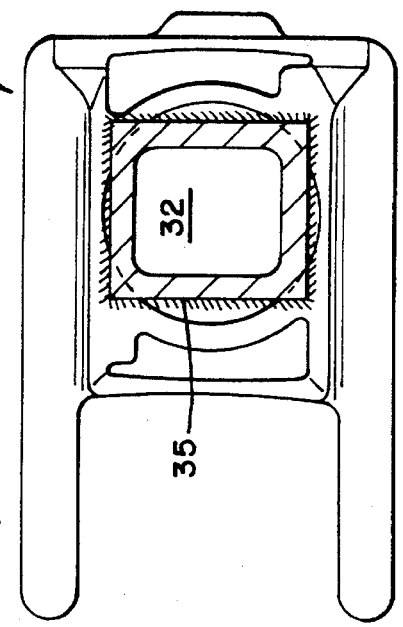

FIG. 13 is a top plan view of an anchor base having a multi-part top recess designed to receive the ends of the pieces of cylindrical pipe, right angle bars, channels and rectangular tubes;

FIG. 14 shows a piece of cylindrical pipe in section welded in the recess of FIG. 13;

FIG. 15 shows a piece of a right angle bar welded in the recess of FIG. 13; and

Figure 16:
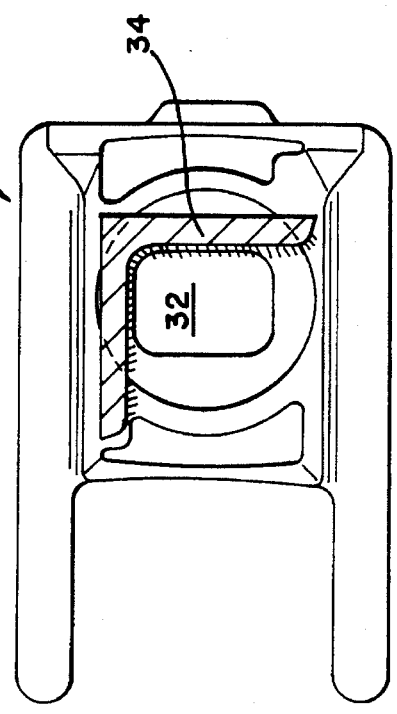

FIG. 16 shows a piece of a square tube welded in the recess of FIG. 13.

Referring to FIGS. 1–3, the pipe anchor is indicated therein generally at 5, combined with a piece of standard commercial pipe of standard diameter indicated generally at 6, to anchor a length of pipe 7, such as a train pipe, to a structural member 8, such as frame member on the underside of a rail car.

It will be understood that the pipe 7 may be of substantial length and is attached or secured at intervals along its length to the structural member 8 in the manner illustrated in FIGS. 1–3.

Pipe anchors similar to pipe anchor 5 are generally known and in wide usage, particularly in the rail car industry, and comprise an anchor base indicated generally at 10 and a mating pipe clamping wedge 11 indicated generally at 11 (FIGS. 1–3). The clamping wedge 11 is drivable into pipe clamping relationship with the anchor base 10 so as to securely clamp the pipe 7 in the pipe anchor 5. The anchor base 10 is secured by means of the piece of standard pipe 6 to the rigid structure 8.

The anchor base 10 is formed with a saddle 12 having at its top an attaching portion 13. The anchor base 10 may be in the form of a casting, forging or stamping and has a pair of inclined flanges or ears 14—14 extending along opposite sides for cooperation with the inclined flange engaging channel formations 15—15 on the clamping wedge 11.

The top or upper surface of the attaching portion 13 of the anchor base 10 is formed with a pipe end locating and receiving recess or socket indicated generally at 16. The purpose of the recess 16 is to receive and locate the lower end of the piece of connector or attaching pipe 6. The sidewall of the particular recess 16 is in the form of four generally triangular shaped corner segments 17—17 (FIG. 6). At its base, the circumference of the recess 16 has four circumferential groove segments 18—18 (FIGS. 6 and 8) the purpose of which is to accommodate therein any hang-nail like remnants or other irregularities that are not completely removed from the end of the attaching pipe 6 when it is cut off. Thus, even if the cut off end of the attaching pipe 6 is not completely finished off and smooth, the groove 18 permits the end of the pipe 6 to be seated firmly and accurately in the recess 16. It will be understood that the diameter of the recess 16 is such as to receive the bottom end of the piece of attaching pipe 6 and allow it to be secured in place therein as by welding indicated at W—W. The upper end of the piece of attaching pipe 6 may likewise be secured to the structural member 8 by welding indicated at W'—W'.

With the length of train pipe 7 seated in the saddle 12 of the anchor base 10, the clamping wedge 11 is assembled to the anchor base 10 by sliding the channels 15 over the lower ends of the flanges or ears 14. The underside of the pipe 7 will seat in the cradle portion 20 (FIG. 2) of the clamping wedge 11. The clamping wedge 11 is then driven firmly into place by directing blows on the downturned formation 21, in known manner. The wedge stops 19 will prevent the clamping wedge 11 from being over driven. When the wedge 11 has been driven "home" so as to firmly clamp the pipe 7 in the anchor base 10, the free end of one of the flanges 14 on the anchor base 10 is bent up as indicated at 22. This bent up end or tab 22 secures the assembly in place. Each tab 22 can be bent up and straightened several times before breaking off. By bending only one tab at a time the useful life of the anchor base 10 can be appreciably extended.

Having described a preferred embodiment of the invention and the manner of use and installation thereof the innovative features of the invention and the advantages thereof over the prior art will be pointed out and described. In many installations wherein a length of pipe, such as pipe 7, is to be attached and secured to a structural member, such as member 8, there is a requirement that the pipe be spaced a certain distance from the structural member. Heretofore, when pipe anchors of the type represented by the pipe anchor 5 have been utilized, the required spacing of the pipe 7 to be anchored from the structural member 8 to which it is to be attached has been accomplished in several ways. In some cases, pipe anchors having suitably dimensioned anchor bases are used so that the anchor bases can be attached directly to the structural member. For example, there are certain installations where the attaching portion 13 of the anchor base 10 can be directly welded to a structural member such as 8. This solution to the spacing requirements has limited application in that it requires the pipe 7 to be anchored to be relatively closely spaced to the structural member 8 and it is expensive to produce anchor bases having a variety of suitable dimensions taking into consideration the cost of tooling for different configurations. Furthermore, since pipe anchors are normally used in large numbers, it is difficult and expensive to maintain inventories of anchor bases of different dimensions.

Heretofore, in those situations in which it was not practical to attach an anchor base of a pipe anchor directly to a structural member, it has been the practice to use connectors of special design and dimensions such, for example, as brackets or other forms of connectors. When such connectors are used, they will usually be preassembled to the anchor bases and this assembly process requires the use of special jigs and fixtures in order to permit assembly on a quantity production scale.

By using suitable lengths of common commercially available pipe of standard diameters in accordance with the present invention, the difficulties and expenses associated with prior art practices and connectors have been eliminated. As is well known, pipe is produced commercially in large quantities in a few standard sizes (e.g. 1 1/4, 1 1/2 inch, 1 3/4, 2 inch etc.). Commercial pipe in such standard sizes is widely available and is the type of pipe that is commonly available in warehouse and hardware stores across the country. By practicing the present invention, it is no longer necessary to use different dimensioned anchor bases or connectors since any particular dimension that is required in the way of spacing a length of pipe to be anchored to a structural member can be achieved by simply cutting standard commercial pipe into pieces of the desired length(s). A manufacturer can readily produce assembled pipe anchors with pieces of attaching pipe as shown in FIGS. 1–3 by cutting standard commercial pipe into pieces of the desired length and then setting one end of each piece into the recess 16 of an anchor base 10 and welding that piece of pipe into place. No special jigs or fixtures are required to perform such an assembly. On the other hand, in situations wherein a length of pipe is to be anchored to a structural member at only a few intervals in a special installation, the installer can cut pieces of standard commercial pipe of the desired length "in the field" using readily available pipe cutters and then weld the cut off pieces to the anchor bases after inserting the ends into the locating recesses 16.

The pipe end locating and receiving recess or socket 16 (FIGS. 3–8) of the anchor base 10 may be modified as shown in FIGS. 9–12 so that the anchor base indicated generally at 23 in FIGS. 9–12 has a recess indicated generally at 24 which is adapted to locate and receive the ends of lengths of standard commercial pipe of three different sizes (i.e. diameters). In FIG. 10 the formation 24 is shown locating and receiving the end of a length of connector pipe 25 which may for example be a piece of one and one-quarter inch diameter pipe. It will be seen that the pipe 25 is received in the recess or socket 24 in the same way pipe 6 is received in recess 16 (FIG. 3). The center of the recess or formation 24 is provided with a circular boss or protuberance which has an outer shoulder 26 and an inner shoulder 27 (FIG. 10). In FIG. 11, the end of a pipe 28 is shown fitting over the shoulder 26 while in FIG. 12, a pipe 30 is shown fitting over the shoulder 27. For example, the pipe 28 may be a piece of one inch diameter pipe while the pipe 30 may be a piece of three-quarter inch diameter pipe.

The pipe end locating and receiving recess or socket 16 (FIGS. 3–8) of the anchor base 10 may also be modified so as to receive for welding thereto the ends of connectors of standard shapes other than short lengths of common cylindrical pipe. Referring to FIGS. 13–16, an anchor base is indicated generally at 31 therein which has a recess in the top indicated generally at 32 which can receive for welding therein the ends of such standard shapes as cylindrical pipe 33 (FIG. 14), a right angle bar 34 (FIG. 15) and a rectangular tube 35 (FIG. 16). It will be seen that the recess can also receive the end of a channel bar in place of the angle iron or bar 34 or the rectangular bar 35.

What is claimed is:

1. Pipe anchor means for anchoring pipe at a plurality of intervals along its length and at a predetermined distance from and to a structural support, comprising a pipe anchor and a relatively short piece of a bar cut to length from a bar of standard commercial shape and dimension, said pipe anchor comprising an anchor base and a mating pipe clamping wedge, said anchor base having a pipe to-be-anchored receiving saddle with an attaching portion, said clamping wedge being drivable into mating relationship with said anchor base wherein it rigidly clamps said pipe to-be-anchored in said saddle, and said attaching portion having a surface to which one end of said piece of a bar is secured, the combined length of said piece of a bar and the distance of said surface from said length of anchored pipe equaling said predetermined distance, and wherein said surface to which said piece of a bar is secured has a bar end locating formation in which the secured end of said piece of a bar is seated in mating relationship.

2. Pipe anchor means as called for in claim 1 wherein said bar end locating formation includes a recess into which the secured end of said piece of a bar is seated in mating relationship.

3. Pipe anchor means for anchoring pipe at a plurality of intervals along its length and at a predetermined distance from and to a structural support, comprising a pipe anchor and a relatively short piece of a bar cut to length from a bar of standard commercial shape and dimension, said pipe anchor comprising an anchor base and a mating pipe clamping wedge, said anchor base having a pipe to-be-anchored receiving saddle with an attaching portion, said clamping wedge being dripable into mating relationship with said anchor base wherein it rigidly clamps said pipe to-be-anchored in said saddle, and said attaching portion having a surface to which one end of said piece of a bar is secured, the combined length of said piece of a bar and the distance of said surface from said length of anchored pipe equaling said predetermined distance, wherein said surface to which said piece of a bar is secured has a bar end locating formation in which the secured end of said piece of a bar is seated in mating relationship, and wherein said bar end locating formation includes a protuberance over which the secured end of said piece of a bar is seated in mating relationship.

4. Pipe anchor means as called for in claim 3, wherein said bar ending locating formation includes a recess into which the secured end of a said piece of a bar may be seated.

5. Pipe anchor means as called for in claim 4, wherein said recess and protuberance are circular.

6. Pipe anchor means as called for in claim 4, wherein at least one of said recess and protuberance is shaped to receive the end of a bar of circular, right angle, channel or rectangular tube shape.

7. A pipe anchor for use in combination with a relatively short piece of a bar of standard commercial shape and dimensions cut to a predetermined length for anchoring a pipe at intervals along its length to and at a predetermined distance from a structural support, comprising a pipe anchor base and a mating pipe clamping wedge, said pipe anchor base comprising a pipe to-be-anchored receiving saddle and an attaching portion, said clamping wedge being drivable into mating relationship with said anchor base to rigidly clamp a said pipe to-be-anchored in said saddle, said attaching portion having a surface with a bar end locating formation in which one end of a said relatively short piece of a bar of standard commercial shape and dimensions can be matingly received and secured.

8. The pipe anchor of claim 7, wherein said bar end locating formation includes a recess into which one end of a said relatively short piece of a standard bar can be matingly received and secured.

9. A pipe anchor for use in combination with a relatively short piece of a bar of standard commercial shape and dimensions cut to a predetermined length for anchoring a pipe at intervals along its length to and at a predetermined distance from a structural support, comprising a pipe anchor base and a mating pipe clamping wedge, said pipe anchor base comprising a pipe to-be-anchored receiving saddle and an attaching portion, said clamping wedge being drivable into mating relationship with said anchor base to rigidly clamp a said pipe to-be-anchored in said saddle, said attaching portion having a surface with a bar end locating formation in which one end of a said relatively short piece of a bar of standard commercial shape and dimensions can be matingly received and secured, and wherein said bar end locating formation includes a recess which has a sidewall and at least one groove in the base of said recess into which hang-nail like remnants on the end of a said short piece of a standard bar secured therein may be received.

10. The pipe anchor of claim 9, wherein said sidewall comprises four corner formations each with an inner sidewall surface and wherein there is a plurality of said grooves.

11. A pipe anchor for use in combination with a relatively short piece of a bar of standard commercial shape and dimensions cut to a predetermined length for anchoring a pipe at intervals along its length to and at a predetermined distance from a structural support, comprising a pipe anchor base and a mating pipe clamping wedge, said pipe anchor base comprising a pipe to-be-anchored receiving saddle and an attaching portion, said clamping wedge being drivable into mating relationship with said anchor base to rigidly clamp a said pipe to-be-anchored in said saddle, said attaching portion having a surface with a bar end locating formation in which one end of a said relatively short piece of a bar of standard commercial shape and dimensions can be matingly received and secured, and wherein said bar end locating formation includes a protuberance over which one end of said short piece of a standard bar may be seated and secured.

12. The pipe anchor of claim 11, wherein said bar end locating formation includes a recess into which one end of a said relatively short piece of a standard bar can be matingly received and secured.

13. The pipe anchor of claim 12, wherein said recess and protuberance are circular.

14. The pipe anchor of claim 12, wherein at least one said recess and protuberance is shaped to receive the end of a bar of circular, right angle, channel or rectangle tube shape.

* * * * *